United States Patent
Belser et al.

(10) Patent No.: US 6,469,465 B1
(45) Date of Patent: Oct. 22, 2002

(54) PRECISION MICRO-MOTOR POSITION CONTROLLER

(75) Inventors: Karl A. Belser, San Jose; Max T. Artusy, Saratoga, both of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/614,946

(22) Filed: Jul. 12, 2000

Related U.S. Application Data

(60) Provisional application No. 60/143,479, filed on Jul. 12, 1999.

(51) Int. Cl.[7] .............................................. G05B 11/01
(52) U.S. Cl. ..................... 318/560; 318/254; 318/266; 318/293; 318/294; 318/295
(58) Field of Search ................................ 318/254, 266, 318/293–295, 560, 439; 310/112, 68 R; 369/32, 34

(56) References Cited

U.S. PATENT DOCUMENTS

| | | | | |
|---|---|---|---|---|
| 3,898,544 A | * | 8/1975 | Tanikoshi | 318/254 |
| 4,674,076 A | * | 6/1987 | Hsieh et al. | 369/32 |
| 5,068,559 A | * | 11/1991 | Satake et al. | 310/112 |
| 5,281,879 A | * | 1/1994 | Satake et al. | 310/114 |
| 5,998,906 A | * | 12/1999 | Jerman et al. | 310/309 |
| 6,134,207 A | * | 10/2000 | Jerman et al. | 369/112 |
| 6,181,050 B1 | * | 1/2001 | Taussig et al. | 310/309 |
| 6,243,350 B1 | * | 6/2001 | Knight et al. | 369/126 |

* cited by examiner

Primary Examiner—Khanh Dang
Assistant Examiner—Rita Leykin

(57) ABSTRACT

A micro-motor position controller utilizes a ratiometric position sensor that operates independent of any reference voltage sources. A first capacitor and a second capacitor in a micro-motor are connected in series and form one section of a capacitive bridge. The other section of the bridge is ground. A first sinusoidal voltage is created at the top of the capacitive bridge and a second sinusoidal voltage that is 180 degrees out of phase from the first sinusoidal voltage is created at the bottom of the bridge. The motor is moved and the capacitance values of the first and second capacitors are changed until, ultimately, there is no voltage present on the armature of the motor. The voltage level present at the armature is measured relative to AC ground, and is used as an error signal to control the position of the motor.

18 Claims, 11 Drawing Sheets

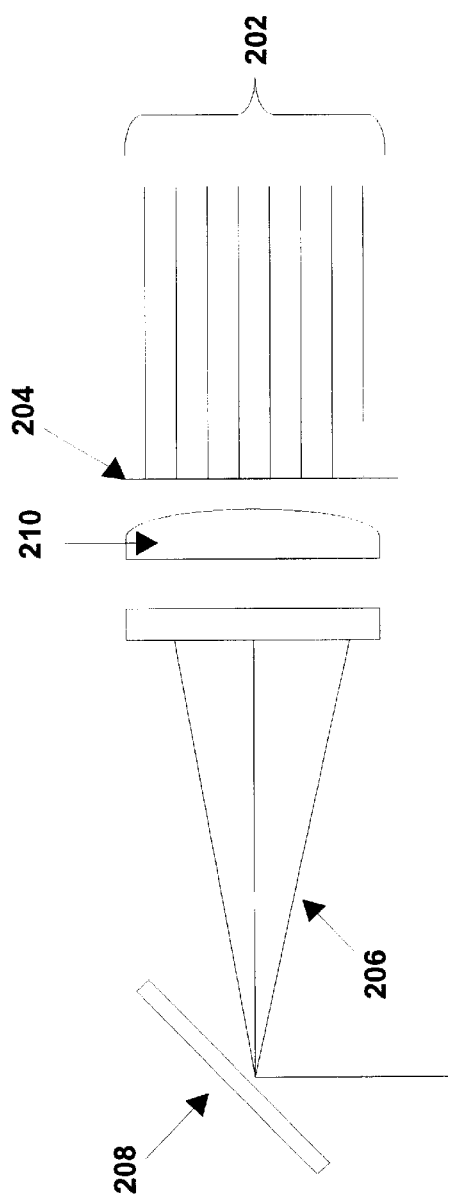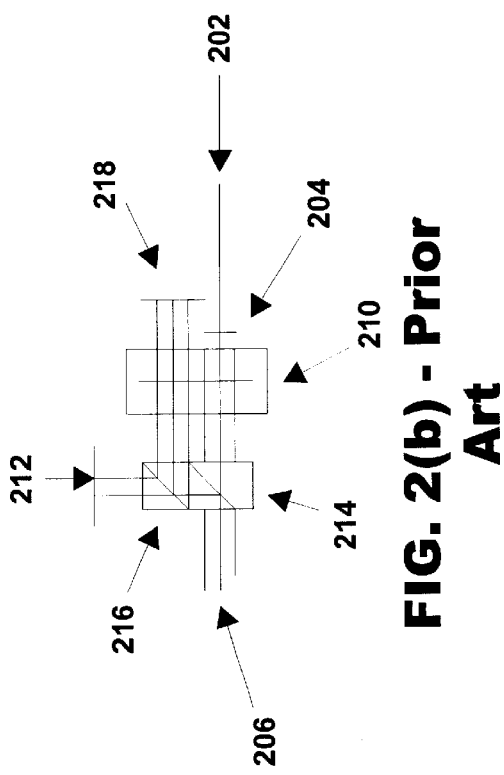
FIG. 2(a) - Prior Art
FIG. 2(b) - Prior Art

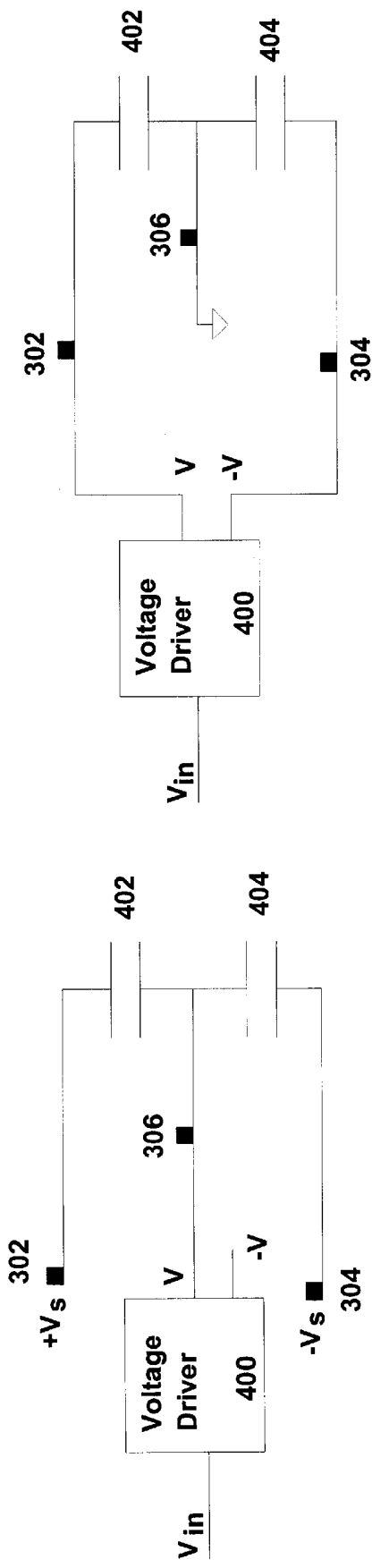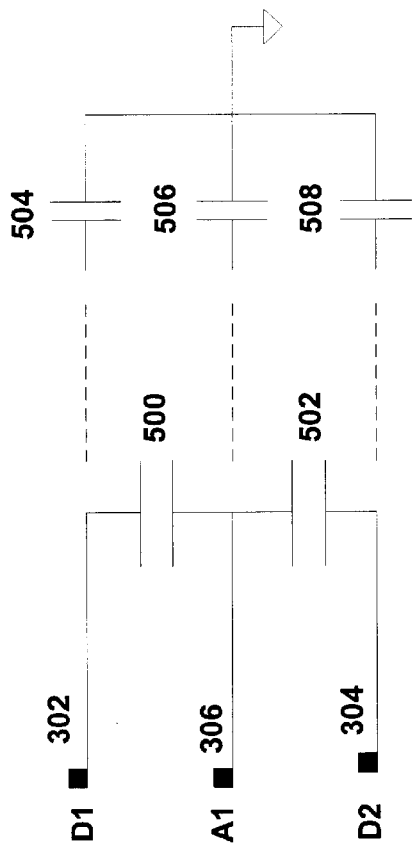
FIG. 4(b)
FIG. 4(a)
FIG. 5

PRECISION MICRO-MOTOR POSITION CONTROLLER

CROSS REFERENCE TO RELATED APPLICATIONS

This application is related to and claims the benefit of commonly assigned U.S. Provisional Application No. 60/143,479, filed on Jul. 12, 1999 and entitled "Precision Micro-Motor Position Controller." The subject matter of this related application is incorporated herein by reference.

BACKGROUND OF THE INVENTION

1. Field of the Invention:

The present invention relates generally to optical switches, and more particularly to a position controller for an optical switch. Still more particularly, the present invention relates to a precision micro-motor position controller.,

2. Description of the Prior Art:

Efficient and economic storage of digital information is an important consideration of manufacturers, designers and users of computing systems. In optically readable storage devices, digital data is typically stored in tracks. located on rotating disks of optically readable storage media. Close positioning of the adjacent disk tracks maximizes the amount of stored data on a storage disk, thus providing significant economic benefits to system manufacturers and users.

One technique that can be used to position adjacent disk tracks closely is optical recording. Optical recording requires an optical fiber to direct light to and from the optical disk. When there is more than one flying optical head in the optical disk drive system, the light from a common optics module must be switched between optical fibers. The light is switched by positioning a focused light beam on the ends of one fiber that contains several fibers therein. A precision micro-motor and accurate position sensing of the micro-motor is needed to implement the switching control function.

FIG. 1 is a diagram of an optically readable storage system that can utilize the precision micro-motor position controller of the present invention. Optically readable storage system 100 includes an optics assembly 102 coupled to a fiber optics switch 104 by an optical fiber 106. Optics assembly 102 is also coupled to a drive module 108. via signal lines 110, 112. A servo module 114 is coupled to the drive module 108 via line 116. Storage system 100 further includes an actuator 118, a plurality of optical fibers 120, a plurality of head arms 122, a plurality of suspensions 124, a plurality of heads 126, and a plurality of optically readable storage media 128.

Each of the plurality of optically readable storage media 128 is typically mounted on a spindle 130 for continuous rotation at a constant angular velocity. Each of the plurality of heads 126 is attached to the actuator 118 by a respective flexible suspension 124 and head arm 122.

To read data from an optically readable storage media 128, light is reflected from the optically readable storage media 128 back through the head 126 to one of the plurality of optical fibers 120. Typically, the plurality of optical fibers 120 are contained in one fiber bundle. In order to find the correct optical fiber, a raster scan of the bundle is performed using a x position device and a y position device. When each optical fiber is located, the position is noted so a fine scan can be performed for each fiber independently.

FIG. 2(a) is a top view of a portion of a prior art position sensing circuit. This prior art position sensing circuit is known in the industry as a lenslet array switch 200. A plurality of fibers 202, are positioned in a straight line and a plurality of lens are molded as one unit in a corresponding straight line. The straight line of lens is known as a lenslet array 204.

A collimating beam 206 is guided to a desired lenslet 204 by the rotating mirror 208. The rotating mirror 208 is positioned by a micro-motor. A redirection lens 210 is used to perform fine adjustments of the collimated beam 206 through the lenslet 204 onto a fiber. The redirection lens 210 can also perform high speed dithering of the focused light beam on the fiber to ensure the best optical coupling is maintained.

Referring to FIG. 2(b), a position sensing device (PSD) 212 provides position feedback to the rotating mirror 208. To generate the position feedback, a 5% beam splitter 214 splits off a portion of the collimated beam 206 to a 50/50 beam splitter 216, where 50% of the beam is guided to the PSD 212. The other 50% of the collimated beam is directed towards the redirection lens 210 and then to a 2xn (two by n) array of photo detectors 218. The photo detectors 218 provide position sensing signals that control the redirection lens 210.

One of the disadvantages to this system is its complexity. Manufacturing the components of the system is an involved process, and constructing the system with the components is complicated. This is particularly true for the position sensing devices, the photo detector array, and the beam splitters. Because of its complexity, creating the system is an expensive process. This is another disadvantage to contemporary position sensing systems.

Another type of micro-motor control system is disclosed in a paper entitled "The Interface and System Considerations of Microactuators for Magnetic Disk Drive" by L.-S. Fan, J. Hong, T. S. Pan, S. Pattanaik, T. Hirano, T. Semba and S. Chan (IEEE Proc. of Transducers '99, pp. 1054–1057, June 1999). The control system drives the armature with a driver and measures the voltage difference between a resistor and capacitor and the armature. The system does not require high precision positioning, and is accurate to only one part in four hundred.

For an optical disk system, however, this accuracy is not acceptable. Optical disk drives utilize long arrays of fibers that require a focused beam to accurately find a particular fiber and then maintain optical coupling with the fiber. Additionally, error measurement is one of the more critical aspects of a micro-motor position controller. To operate at an optimal level, the system must be able to make very precise error measurement. Thus, a need exists for an improved micro-motor position controller.

SUMMARY OF THE INVENTION

The present invention overcomes the limitations of the prior art systems by providing a micro-motor position controller that determines a position error signal by a differential voltage measurement relative to ground. In the exemplary embodiment, a micro-motor is comprised of a first stator, a second stator, and an armature. A first capacitor is created between the first stator and the armature. A second capacitor is created between the second stator and the armature. To move the armature, a higher voltage difference is produced between one stator and the armature while a smaller voltage difference is created between the other stator and the armature. The first and second capacitors are connected in series in order to form one section of a capacitive bridge.

In one exemplary embodiment two multiplying digital-to-analog converters (DAC) are used to provide sinusoidal voltages to the top and bottom locations of the one section of the capacitive bridge. The other section of the capacitive bridge is ground (no sinusoidal voltage). The sinusoidal voltage at the top of the bridge and the sinusoidal voltage at the bottom of the bridge are out of phase by 180 degrees. The motor is moved and the capacitance values of the first and second capacitors are changed until no voltage is present on the armature. This allows the voltage level at the armature to be measured relative to AC ground and then used as a feedback signal to control the motor. The voltage values from the multiplying DACs determine the set point for the motor position. In the exemplary embodiment, the gains of the DACs are adjusted in a complementary fashion.

In an alternative exemplary embodiment, a micro-motor position controller is comprised of a high voltage amplifier circuit, a bridge, a position set/bridge driver circuit, and a low capacitance preamplifier/overload protection circuit. A digital potentiometer and a bridge driver are used to set the ratio of the capacitance values of the first and second capacitors of the micro-motor. The low capacitance preamplifier senses an error signal for the micro-motor. The error signal drives the high voltage amplifier so that the ratio of the capacitance values of the first and second capacitors mimics the ratio of the input signals created by the bridge driver and the digital potentiometer.

Another aspect of the alternative exemplary embodiment includes the use of a balanced modulator. The balanced modulator is implemented with two signal channels. One channel is comprised of the signal plus some error (signal+error). The second channel is comprised of (−signal+error). Subtracting the two channels generates the output of balanced modulator. This causes the error to be subtracted out of the output signal. This is highly desirable, because any error in the output is equivalent to an error in the set point of the motor.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

FIG. 2(*a*) is a top view of a portion of a prior art position sensing circuit;

FIG. 2(*b*) is a side view. of the portion of a prior art position sensing circuit in FIG. 2(*a*);

FIGS. 4(*a*)–4(*b*) are conceptual diagrams illustrating alternative voltage drive circuits that can be used with the micro-motor of FIG. 3;

FIG. 5 is a schematic diagram of the micro-motor in FIG. 3;

DESCRIPTION OF THE PREFERRED EMBODIMENT

The present invention relates to a precision micro-motor position controller. The following description is presented to enable one of ordinary skill in the art to make and use the invention and is provided in the context of a specific embodiment, namely an optically readable storage system. However, the present invention is not limited to this embodiment. Various modifications to the specific embodiments will be readily apparent. to those skilled in the art and the generic principles herein may be applied to other implementations that require very accurate position sensing. Thus, the present invention is not intended to be limited to the embodiment shown but is to be accorded the widest scope consistent with the appended claims and with the principles and features described herein.

Figure 1:
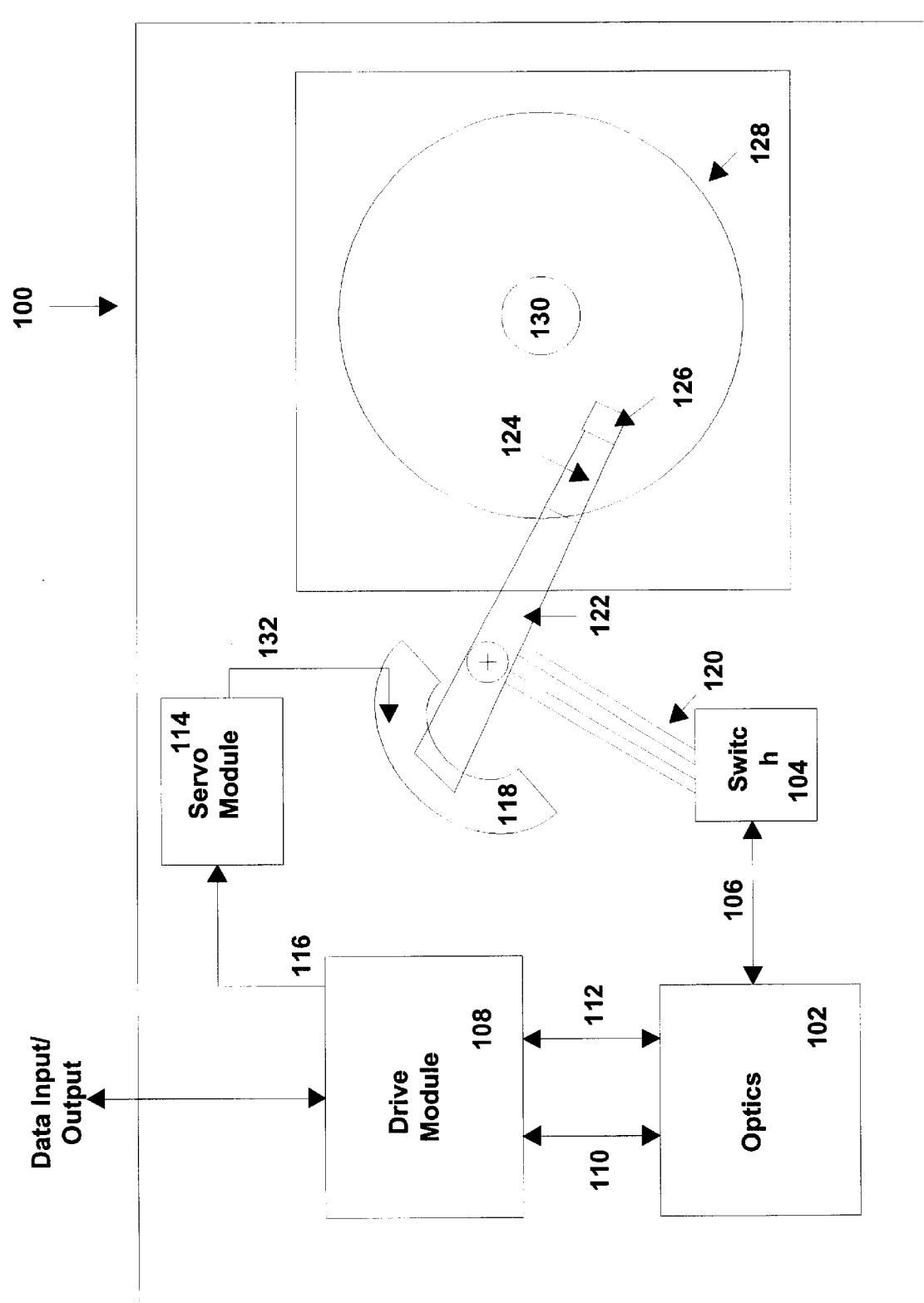
FIG. 1 is a diagram of an optically readable storage system that can utilize the precision micro-motor position controller of the. present invention.
Figure 3:
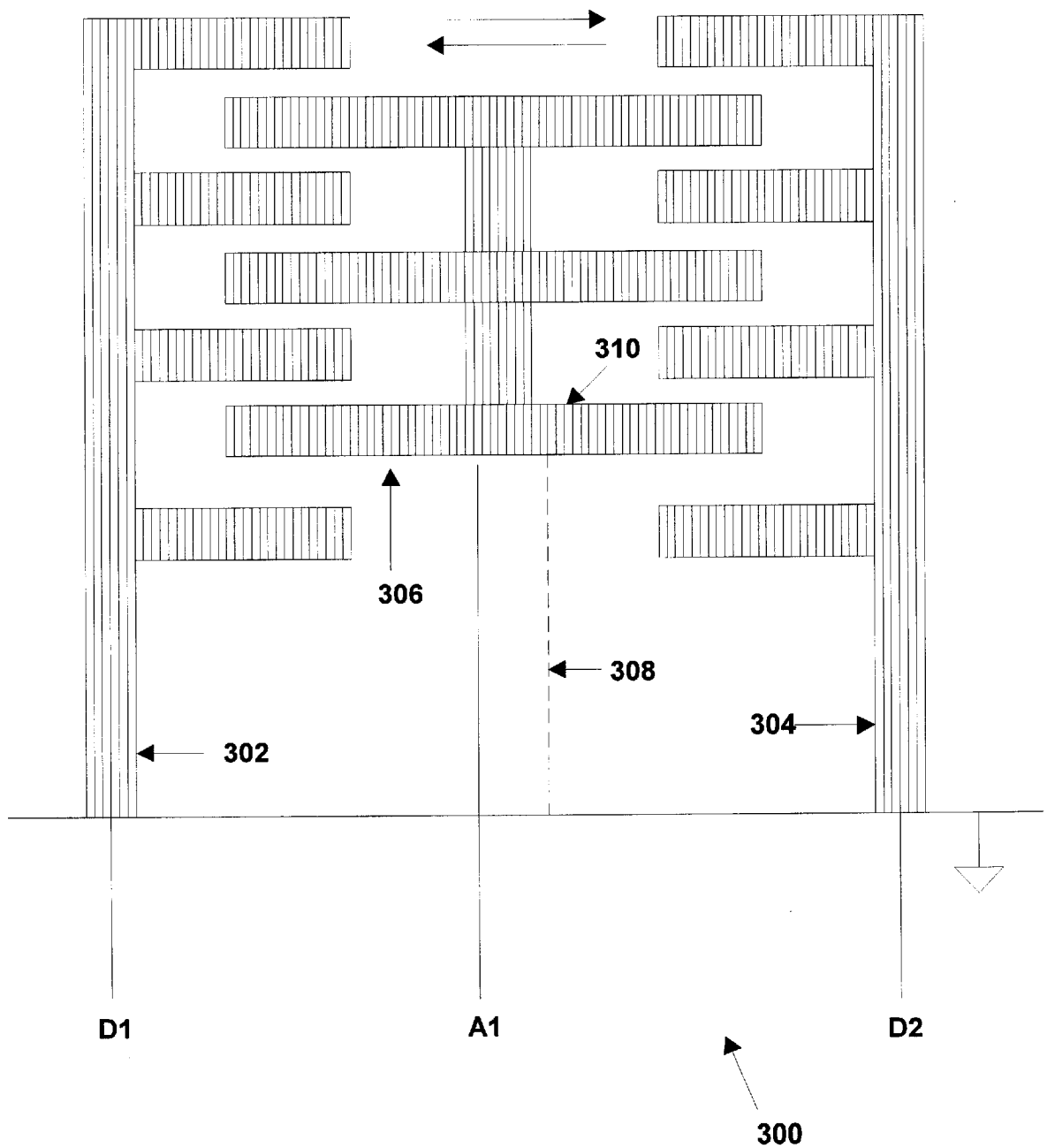
FIG. 3 is a conceptual diagram illustrating a micro-motor that can be used in a precision micro-motor position controller according to the present invention.

With reference now to the figures and in particular with reference to FIG. 3, a conceptual diagram illustrating a micro-motor that can be used in a precision micro-motor position controller according to the present invention is shown. The micro-motor 300 is comprised of a first stator 302, a second stator 304, and an armature 306. The armature 306 is suspended by a spring 308 such that the armature 306 moves in a horizontal (left to right) direction only. This allows the plurality of fingers 310 of the armature 306 to slide in between the fingers of the first and second stators 302, 304. It is important to note that the armature 306 should not move in the vertical direction.

Micro-motor 300 is a capacitance motor that is used to determine a position error signal. Micro-motor 300 is micro-machined in silicon in the exemplary embodiment. Micro-motor 300 simultaneously measures the capacitance and applies a force (via voltage) to move the armature 306 back and forth. The force produced by the motor is proportional to the applied voltage squared. Spring 308 has a force that is equal to a constant multiplied by a distance. The position of the armature 306 is adjusted by applying a force against the spring 308.

Referring to FIGS. 4(*a*)–4(*b*), conceptual diagrams illustrating alternative voltage drive circuits that can be used with the micro-motor of FIG. 3 are shown. To move armature 306, a higher voltage difference is produced between one stator and the armature while a smaller voltage difference is created between the other stator and the armature. These voltage differences can be generated by driving the armature of the motor (FIG. 4(*a*)) or by driving the stators of the motor (FIG. 4(*b*)).

In FIG. 4(*a*), a positive voltage (+Vs) is applied to first stator 302 (D1), and a negative voltage (−Vs) is applied to second stator 304 (D2). A voltage driver 400 is coupled to armature 306 (A1), and is used to create the voltage differences between the first and second stators 302, 304 and the armature 306. By having one voltage difference be greater than the other, a push-pull. action is created, where the force is lowered in one direction and increased in the other direction. This push-pull action is what moves the armature 306.

Alternatively, the voltage driver 400 can be coupled to first stator 302 (D1) and second stator 304 (D2), while the armature 306 (A1) is coupled to ground. The voltage driver 400 generates a positive voltage signal V and a negative voltage signal –V, and these signals are used to produce voltage differences between first stator 302, second stator 304, and armature 306. The capacitance of a push-pull armature pair is linearly proportional to displacement.

FIG. 5 is a schematic diagram of the micro-motor in FIG. 3. The first stator 302 and armature 306 create a first capacitor 500, while the second stator 304 and armature 306 create a second capacitor 502. First capacitor 500 and second capacitor 502 are connected in series and form one section of a capacitive bridge. The other section of the capacitive bridge is ground. Stray capacitance is produced as well, and is illustrated in FIG. 5 by stray capacitors 504, 506, 508.

Stray capacitance is a problem because it is usually much larger than the values that are measured in the exemplary embodiment. In fact, the stray capacitance can have a value between one and three picofarads (pF), while the desired capacitance is measured in attofarads (aF). Since an attofarad is $1/1,000,000$ of a picofarad, it is necessary to eliminate the effects of the stray capacitance in order to accurately measure the desired capacitance, which in turn is used to determine the position error signal.

For example, the capacitance value of the first capacitor is (a)*250,000 aF and the capacitance value of the second capacitor is (1-a)*250,000 aF, where (a) is 0.5 in the neutral center position. But the stray capacitance has a value of about 5,000,000 aF between each stator and ground, and between the armature and ground. Additionally, the stray capacitance may change by 0.1% or five thousand aF. Thus, in order to measure accurately the desired capacitance values, the overall accuracy of the position controller is about one part in ten thousand, with a capacitance sensing resolution of fifty aF. And the changes in stray capacitance correspond to a position change of no more than one part per ten thousand.

In the exemplary embodiment, the effects of stray capacitance when measuring position error are nullified by fixing the top and bottom of the capacitive bridge with a voltage source so the stray capacitors 504, 508 do not affect the error measurement. And by keeping the voltage level at node 306 relative to ground at a zero, or near zero, level, stray capacitor 506 does not affect the error measurement.

Figure 6:
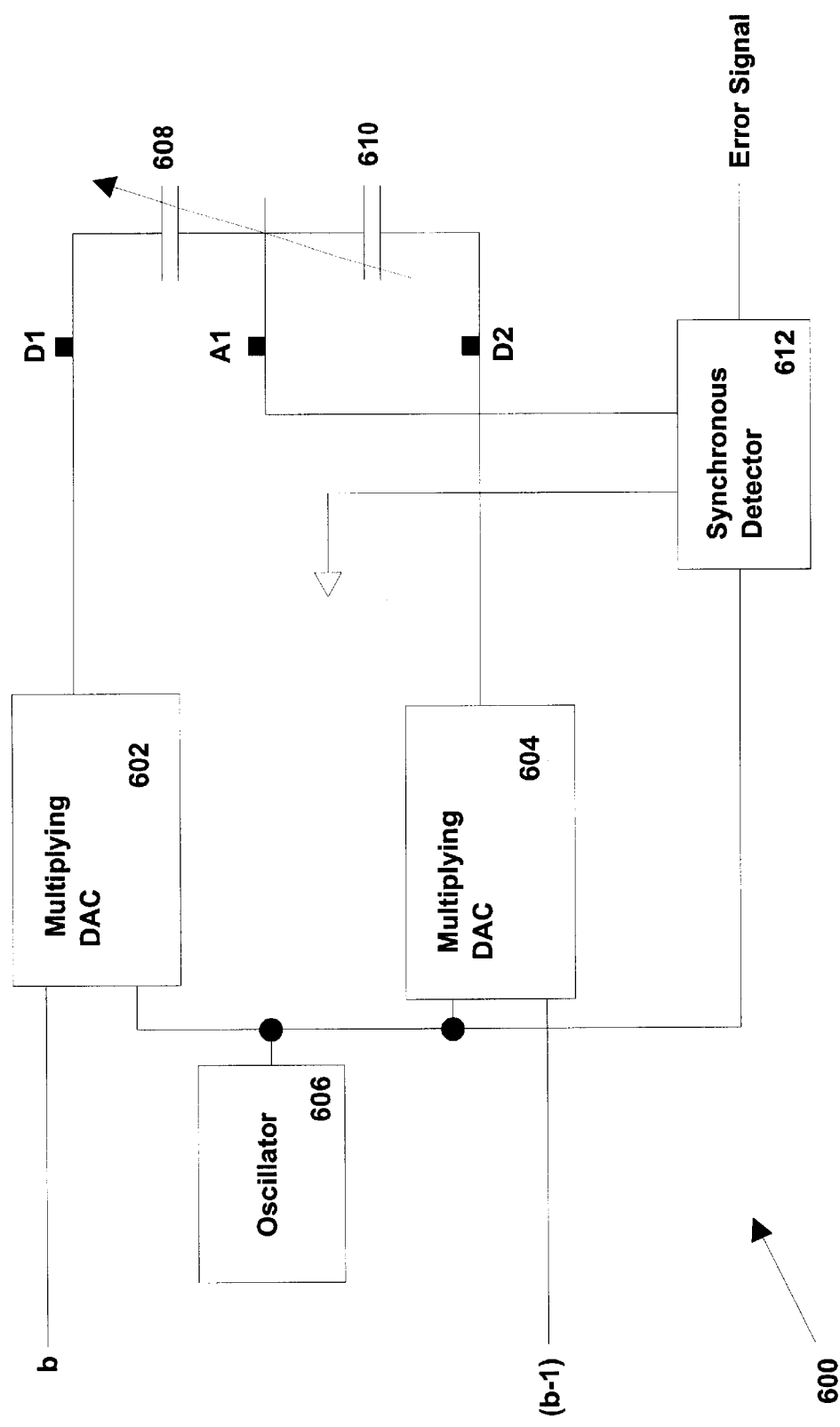
FIG. 6 is a diagram depicting an exemplary position-sensing circuit according to the present invention.

Referring to FIG. 6, a diagram depicting an exemplary position-sensing circuit according to the present invention is shown. In this exemplary embodiment, the capacitance of the motor does not have to be measured exactly, but the position of the feedback control system must be repeatable to one part in ten thousand. The exemplary position-sensing circuit 600 is comprised of a first multiplying digital-to-analog converter (DAC) 602 and a second multiplying DAC 604. Multiplying DACs 602, 604 have a programmable resistor in the feedback path of an operational amplifier, thereby allowing the gain of the operational amplifier to be programmed.

An oscillator 606 inputs a signal into multiplying DACs 602, 604. A low impedance positive voltage source (b) is also input into DAC 602, where 0<b<1. A low impedance negative voltage source (b-1) is input into DAC 604. The oscillator, positive voltage source (b) and the negative voltage source (b-1) excite the motor with a high frequency sine wave. In the exemplary embodiment, oscillator 606 has a frequency of 1 MHz. The signal generated by the oscillator is input into a high pass filter (not shown) in order to remove the low frequency components of the signal. In this exemplary embodiment, the high pass filter removes signals below twenty (20) kHz.

The frequency of the motor is limited to the rate of change of the voltages that control the position of the motor, and in the exemplary embodiment the frequency is below 20 kHz. Note that the oscillator signal (after passing through the high pass filter) has a frequency above 20 kHz. The frequencies of the motor and the oscillator are purposefully operated at different frequencies so they do not interfere with each other.

The position of the motor is determined by the capacitance ratio between capacitor 608 and capacitor 610. Voltage sources (b) and (b1) drive nodes D1 and D2 so that the stray capacitance will not cause errors in the measurements. The node A1 will have no voltage across it when the motor is in the desired position. Those skilled in the art will appreciate that by adjusting the values (b) and (b-1) (i.e., setting the gain on the DACs), any combination of capacitance can be obtained. As the armature moves in the left and right direction, the capacitance (a*C) of capacitor 608 and the capacitance ((1-a)*C) of capacitor 610 will move in the same ratio. The values of (a) and (1-a) are adjusted until there is no voltage at node A1. Thus, the position sensor is a ratiometric position sensor that operates independent of any reference voltage sources.

A synchronous detector 612 is used to detect the output of the capacitive bridge with a sine wave. In the exemplary embodiment, synchronous detector 612 has a low pass filter associated with it (not shown). This generates an error signal that indicates the position of the motor. Those skilled in the art will appreciate that the position-sensing circuit 600 obtains accurate position reproducibility, even with small position errors. In this exemplary embodiment, the multiplying DACs 602, 604 are used for coarse position control.

Figure 7:
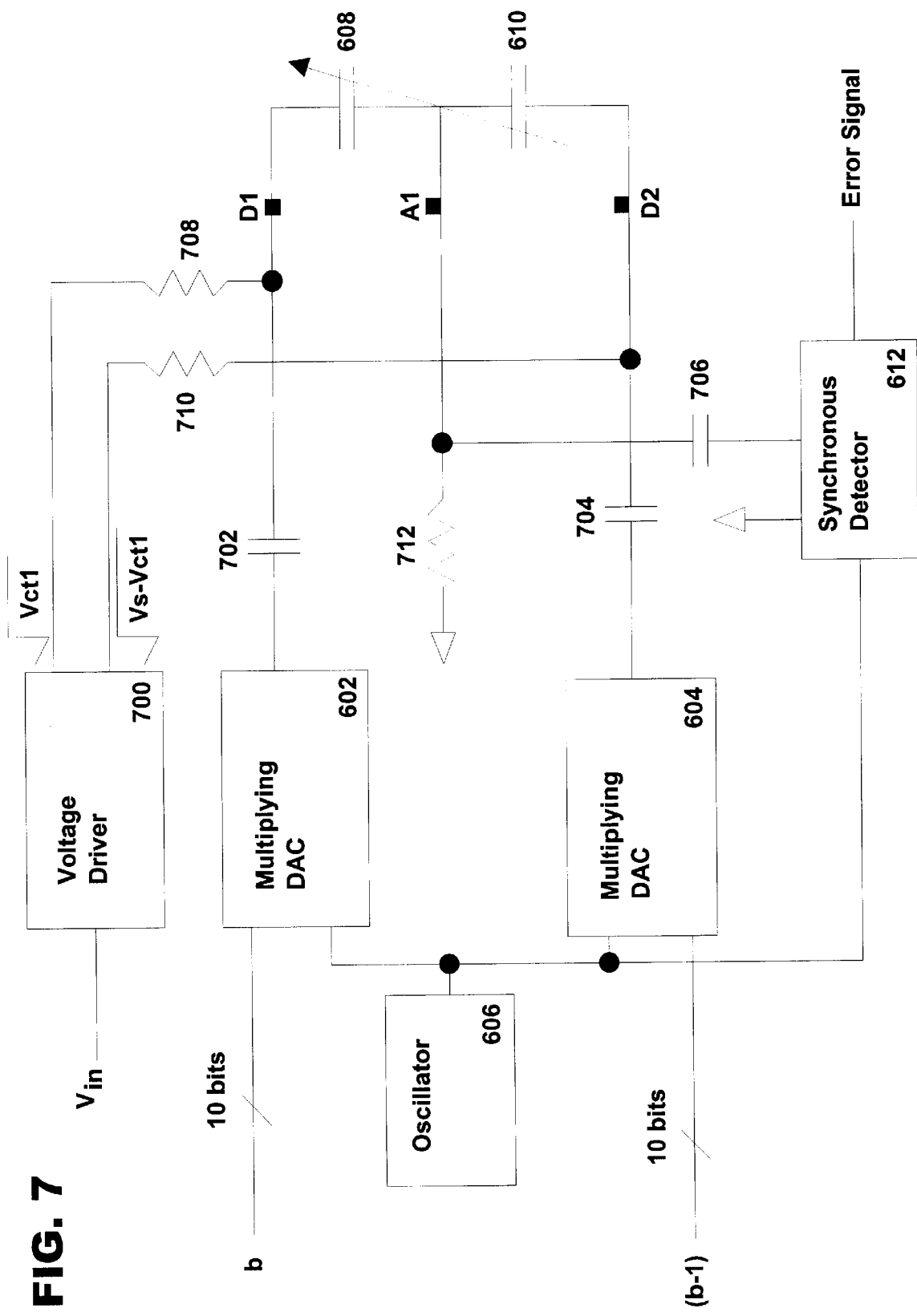
FIG. 7 is a diagram illustrating an exemplary position-sensing circuit coupled to an exemplary motor driver circuit from FIG. 4(*b*) according to the present invention.

FIG. 7 is a diagram illustrating an exemplary position-sensing circuit coupled to the exemplary motor driver circuit from FIG. 4(b) according to the present invention. A voltage driver 700 is used to excite the first and second stators of the motor. A capacitance sensor is coupled through a high pass filter consisting of capacitor 702 and resistor 708 at node D1, capacitor 704 and resistor 710 at node D2, and capacitor 706 and resistor 712 at node A1.

Those skilled in the art will recognize that the high pass filters, when driven in reverse, are low pass filters for the voltage drive signals Vct1, –Vct1, and ground. The values of capacitors 702, 704, 706 and resistors 708, 710, 712 are chosen relative to the capacitance to be measured (capacitance (a*C) of capacitor 608 and the capacitance ((1-a)*C) of capacitor 610). In the exemplary embodiment, the capacitors 702, 704, 706 are approximately ten times larger than the capacitance to be measured. The resistors 708, 710, 712 are approximately one hundred times larger than the effective impedance of the capacitance when the sine wave is input. Additionally, the values for capacitors 702, 704, 706 and resistors 708, 710, 712 are selected such that the driver loop has a bandwidth of approximately 20 kHz and the capacitance of the bridge is not loaded too much.

Figure 8:
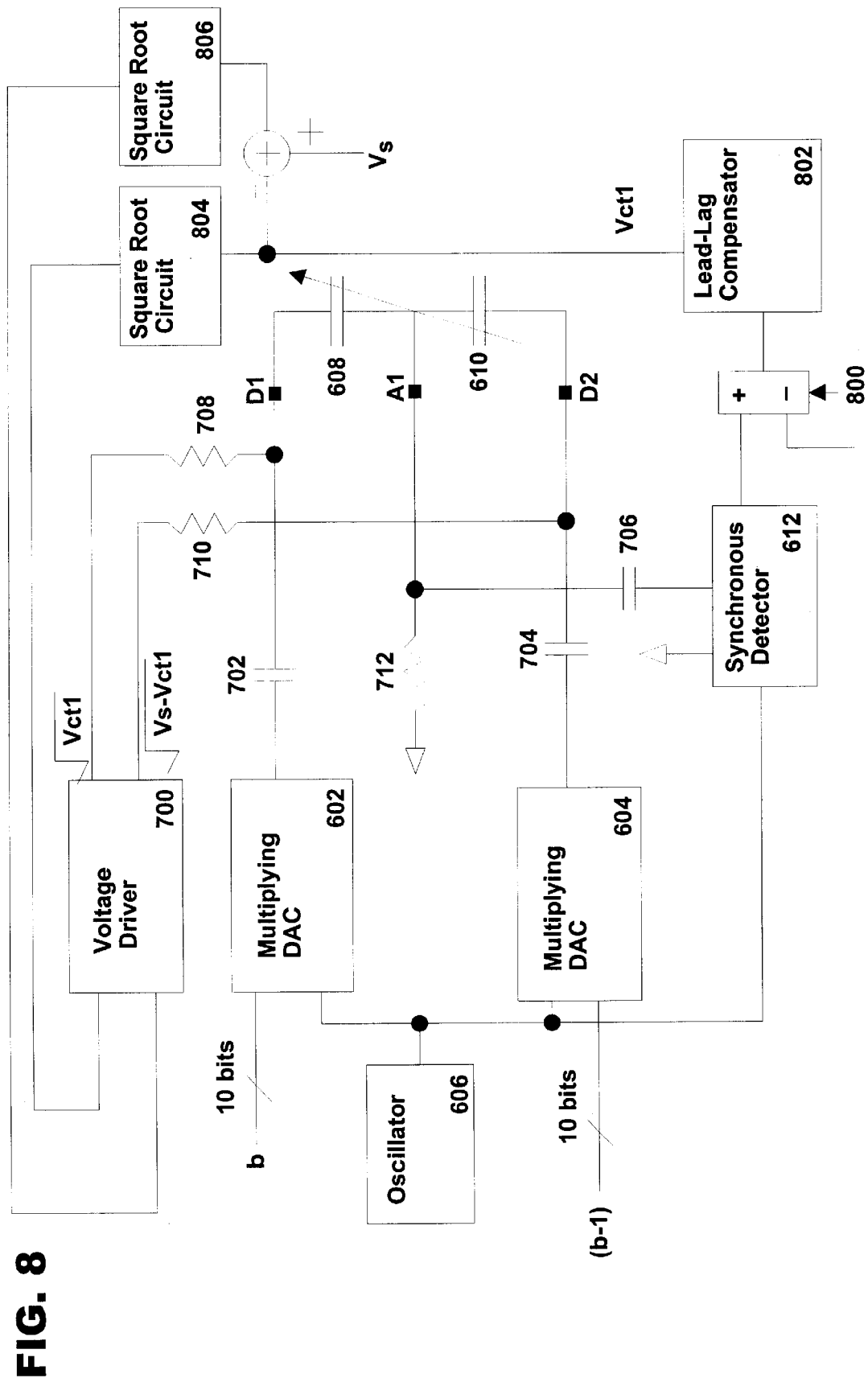
FIG. 8 is a diagram depicting an exemplary micro-motor position controller according to the present invention.

Referring to FIG. 8, a diagram depicting an exemplary micro-motor position controller according to the present invention is shown. In this exemplary embodiment, a fine position control loop has been added to the micro-motor position controller. The fine position control is implemented by using an error signal offset, and the range of the fine control loop should be about twice that of the smallest step controlled by the coarse loop.

Fine position control loop is comprised of an offset 800, a lead-lag compensator 802, and a first square root circuit 804 and a second square root circuit 806. The outputs of the square root circuits 804, 806 are inputs into the voltage driver 700. Vs is a power supply voltage. In the exemplary embodiment, square root circuits 804, 806 are utilized because the force is proportional to the voltage squared. The square root circuits 804, 806 compensate for voltage squared.

The offset 800 is used to perform a fine adjustment of the voltage at nodes D1 and D2, thereby allowing the position of the motor to be adjusted finely. In the exemplary embodiment, the micro-motor position controller has a repeatable position accuracy of one part in four thousand, and the fine position control loop of one part in ten thousand.

Figure 9:
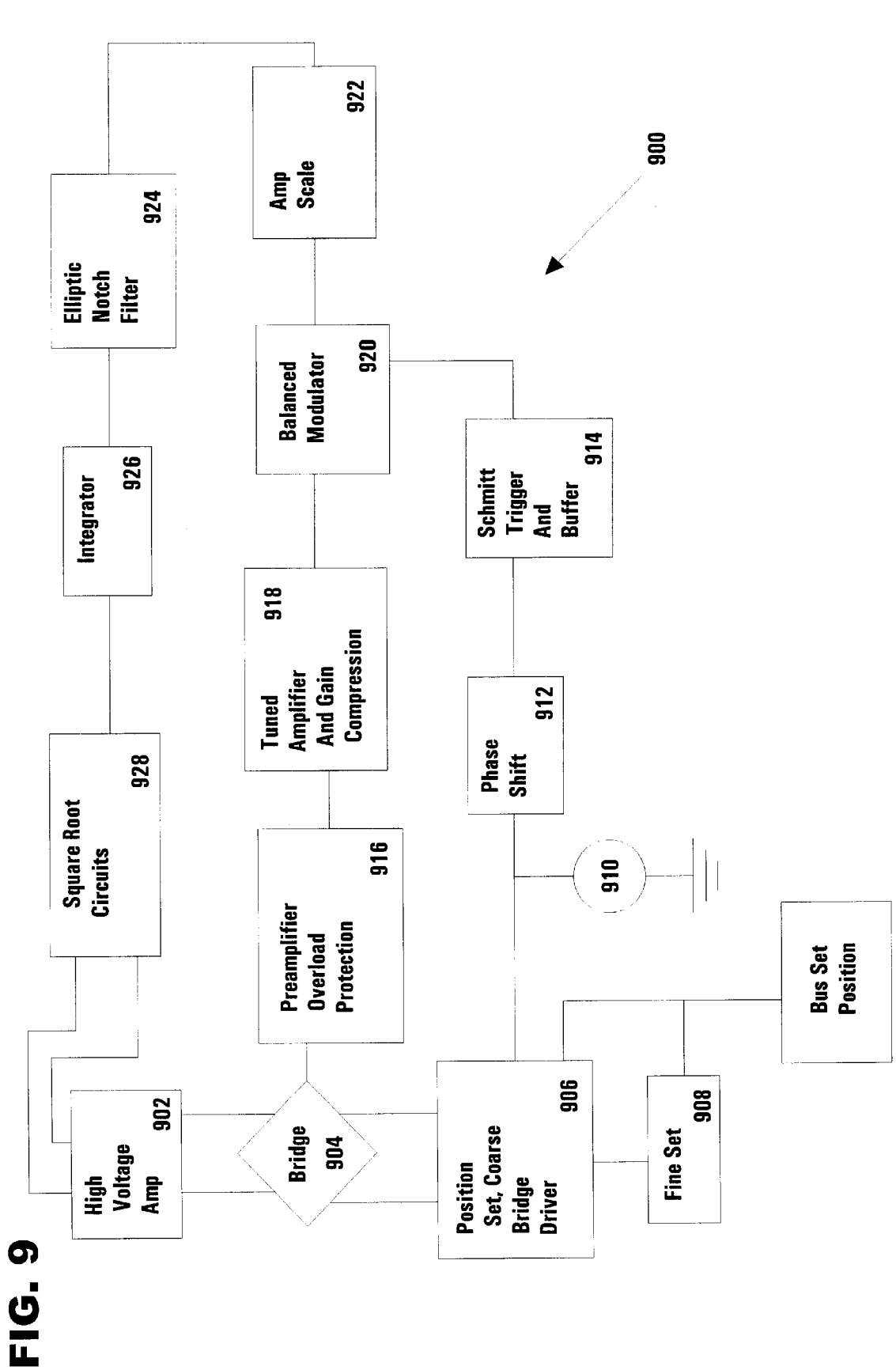
FIG. 9 is a block diagram illustrating an alternative micro-motor position controller according to the present invention.

FIG. 9 is a diagram illustrating an alternative micro-motor position controller according to the present invention. Micro-motor position controller 900 is a phase sensitive detection system. Micro-motor position controller 900 includes a high voltage amplifier circuit 902, a bridge 904, a position set/bridge driver circuit 906, and a fine set circuit 908. An alternating current (AC) supply 910, phase shift circuit 912, Schmitt trigger 914, preamplifier/overload protection circuit 916, a tuned amplifier and gain compression circuit 918, a balanced modulator 920, a differential amplifier 922, an elliptic notch filter, 924, an integrator 926, and a square root circuit 928 are also included in micro-motor position controller 900.

Figure 10A:
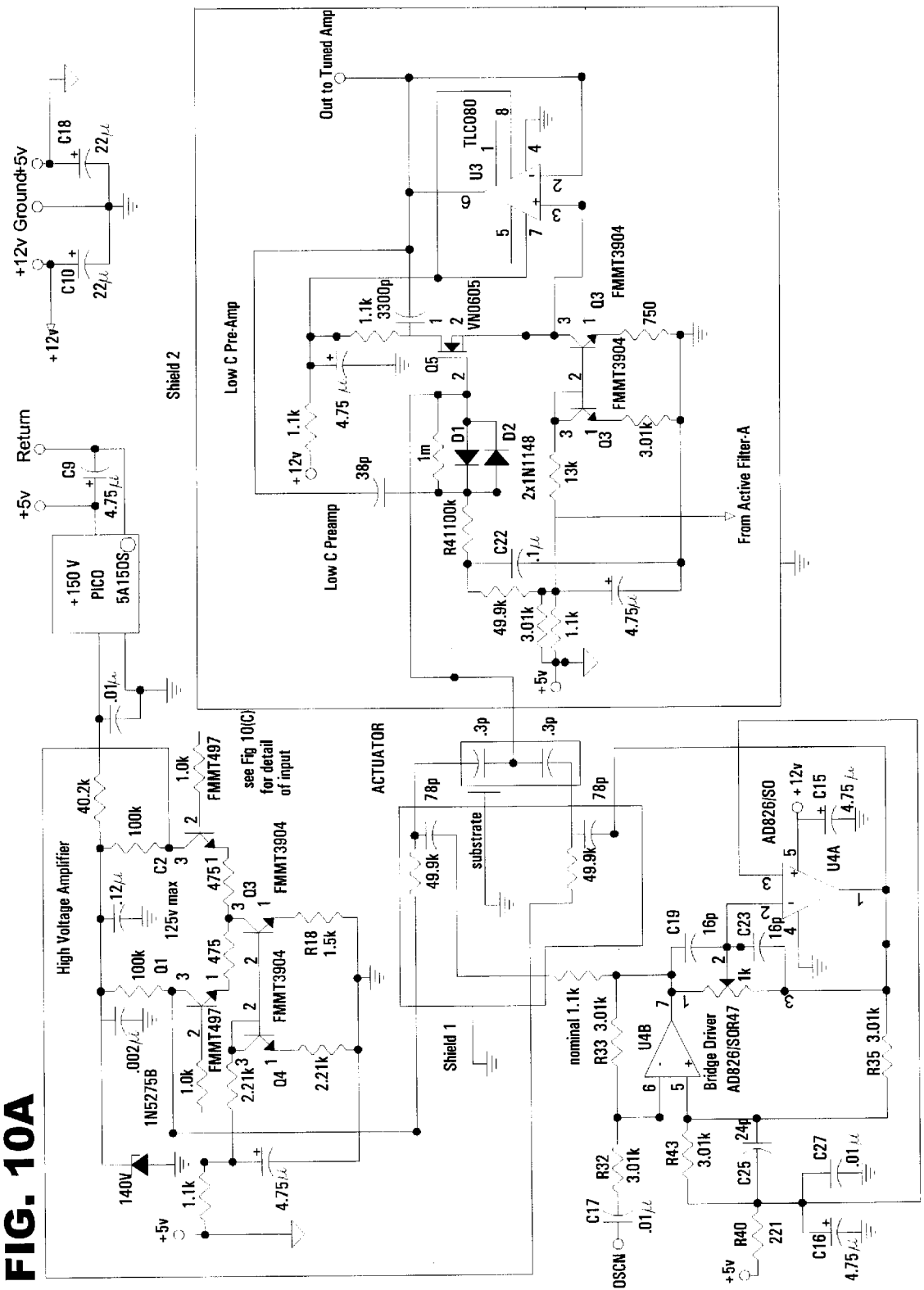
FIGS. 10(*a*)–10(*c*) are schematic diagrams of the alternative micro-motor depicted in FIG. 9.
Figure 10B:
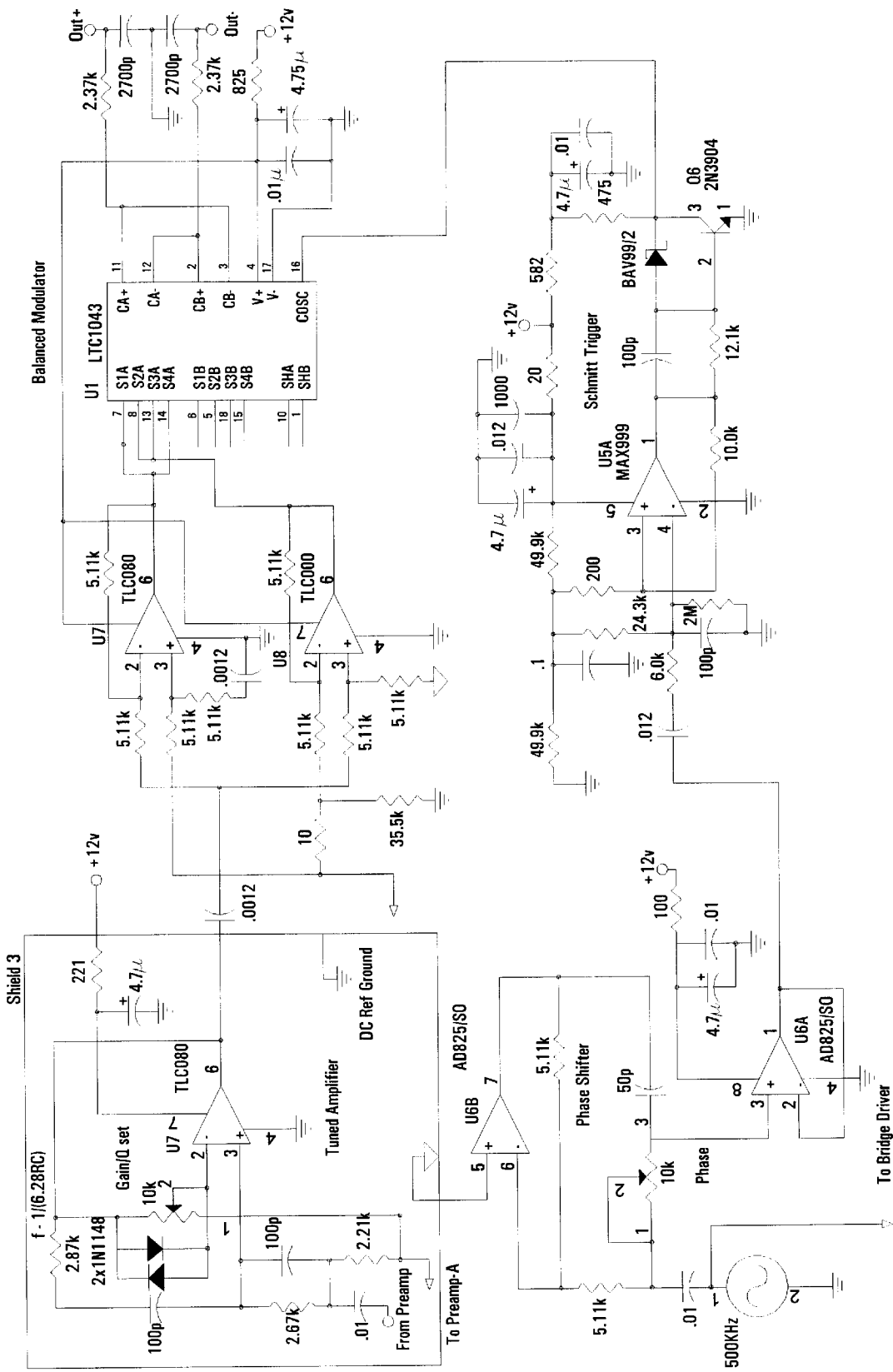
Figure 10C:
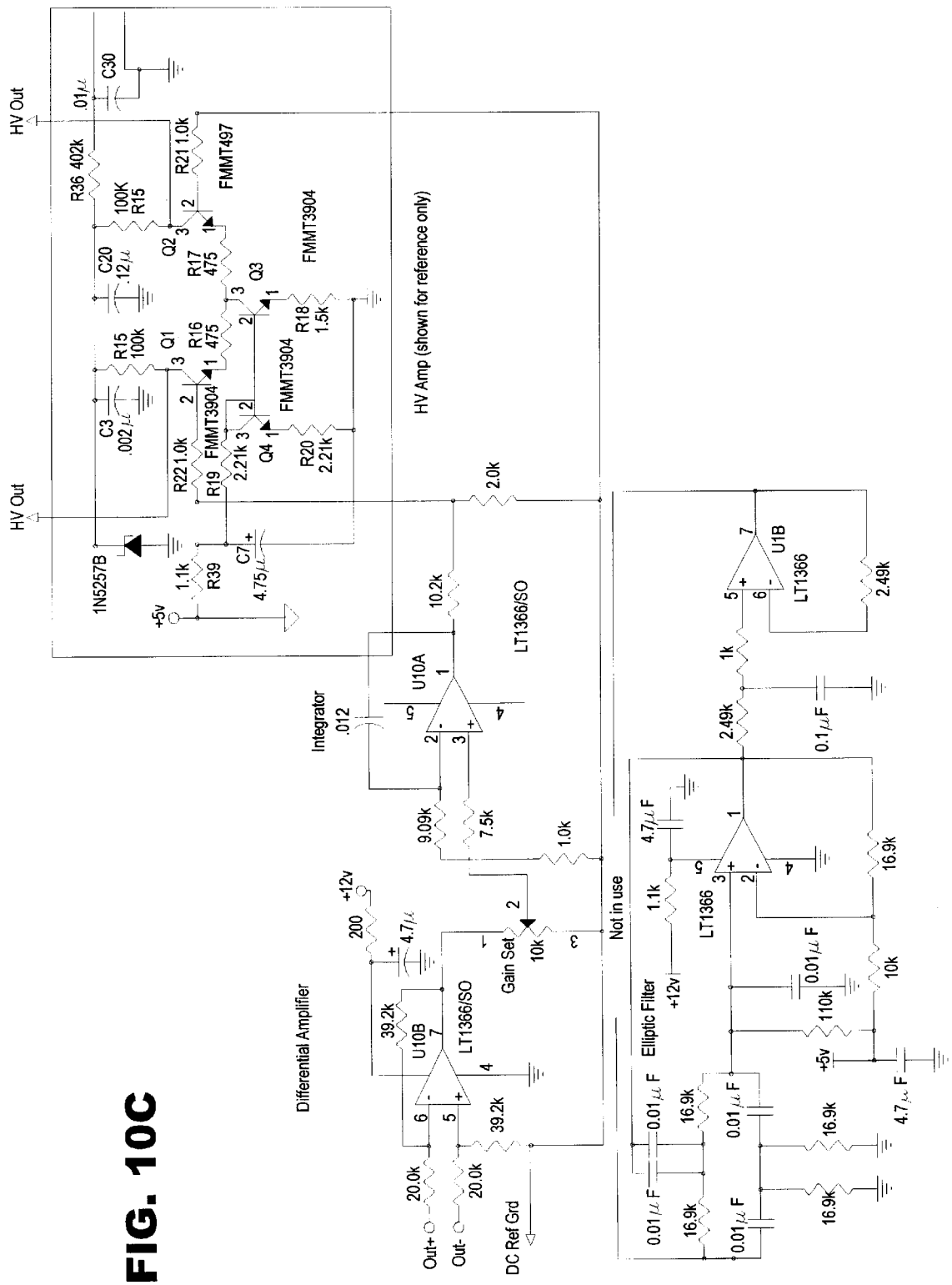

Referring to FIGS. 10(*a*)–10(*c*), schematic diagrams of the alternative micro-motor depicted in FIG. 9 are shown. Only those elements necessary to understanding the present invention will be discussed in greater detail. FIG. 10(*c*) is a schematic diagram of the differential amplifier 922, the elliptic notch filter 924, and the integrator 926. The functionality of these elements are well known in the art, and as such, they will not be discussed in more detail.

FIG. 10(*a*) illustrates the high voltage amplifier circuit 902, the bridge 904, the position set/bridge driver circuit 906, and the low capacitance preamplifier/overload protection circuit 916. In this alternative embodiment, multiplying DACs are not used. A bridge driver U4A, U4B and a digital potentiometer R47 are used instead.

The bridge driver produces two outputs, Asin(wt) and −Bsin(wt). The bridge driver U4B and potentiometer R47 are used to set the position of the motor. The desired position of the motor (actuator) occurs when the voltage between the armature of the motor and ground reaches zero. Setting the voltage level is accomplished by changing the resistive value of the potentiometer R47, which in turn changes the amplitude of the sine waves Asin(wt) and −Bsin(wt).

Capacitors C19 and C23 may be needed in order to compensate for the non-ideal nature of the motor at the ends of travel. Capacitors C19 and C23 provide variable lead-lag compensation. It is important that the set point potentiometer R47 and compensating capacitors C17 and C23 mimic the non-ideal nature of the motor.

The bridge 904 is protected by a Faraday shield (shield 1), because the signals and measurements are so small that errors and interference can be introduced easily into the circuit. In this alternative embodiment, the bridge is implemented using a resistive-capacitance circuit. The high voltage amplifier circuit 902 is comprised of a high voltage differential amplifier that is DC coupled to the motor through the resistors coupled to the AC injection 78 pF capacitors contained within shield 1. This drives the motor.

The motor is located in the box labeled "actuator", and the low capacitance preamplifier/overload protection 916 is protected by a second Faraday enclosure (shield 2). The low capacitance preamplifier 916 is used to sense the error signal. The low capacitance is achieved by several bootstrapped sections (also known as guarding). Q5 is a source follower, and the gain would be approximately 0.9 except for the current source connected to the source lead. This raises the gain to 1.0 and bootstraps the capacitance between the gate and source. Current is equal the capacitance times, dv/dt [I=C*dv/dt]. With bootstrapping, the dv term of the equation is zero (due to the gain of 1.0), so no current is lost to Cgs.

The overload protection 916 is implemented by two diodes D1 and D2 connected across the input. Another feedback loop is used to bootstrap the diodes in order to reduce the capacitance of the diodes. When an overload occurs, the diodes D1 and D2 clamp the signal. This allows the overload protection circuit in this embodiment to recover quickly. In other words, the overload protection circuit 916 rejects an overload produced by the high voltage amplifier when the bridge is perturbed. This greatly improves settling time. In this alternative exemplary embodiment, the system can respond to 100 microvolt levels after a 200 volt transition, and the front end amplifier begins to respond after only 20 microseconds of overload. Additionally, a third feedback loop is used to neutralize the capacitance from the gate to drain. This is important since this component will contribute the major capacitive load as a result of Miller effect multiplication.

In this alternative embodiment, the position set/bridge driver circuit 906 and the fine set circuit 908 are implemented by the digital potentiometer R47. If a separate fine set circuit is desired for greater accuracy, a circuit similar to the one shown can be used to implement this separate fine set.

FIG. 10(*b*) depicts the tuned amplifier 918, the balanced modulator 920, the AC supply 910, the phase shifter 912, and the Schmitt Trigger 914. AC supply 910 has a frequency of 500 kHz in this embodiment. The tuned amplifier 918 is protected by a third Faraday shield, and is comprised of a Wien bridge oscillator operated with a loop gain below unity. The two diodes in the tuned amplifier 918 are placed across the feedback resistor as overload protection. As the amplitude increases, the diodes conduct, producing a soft clipping. For signals less than one volt peak-to-peak, the amplifier continues in linear operation.

The balanced modulator 920 is implemented with two signal channels. One channel is comprised of the signal plus some error (signal+error). The second channel is comprised of (−signal+error). The output of balanced modulator 920 is generated by subtracting the two channels. This causes the error to be subtracted out of the output signal. This is highly desirable, because any error in the output is equivalent to an error in the set point of the motor.

The phase shifter 912 uses an inverting amplifier to create a waveform of −Asin(wt) in this alternative embodiment. Two signals, Asin(wt) and −Asin(wt) are used, along with the RC network, to product an adjustable phase shift. This is used to compensate phase errors in the amplifier chain.

Those skilled in the art will appreciate the present invention provides a precision micro-motor position controller that operates independently of any reference voltages. Instead, a capacitance ratio is used to position the motor. As the armature moves in the left to right direction, the capacitance in the bridge moves in the same ratio. Additionally, the micro-motor position controller is very robust, since any changes in the bridge driver power supply do not affect the measurements. In other words, the micro-motor position controller is not sensitive to changes of the drive amplitude.

While the invention has been particularly shown and described with reference to a specific embodiment, it will be understood by those skilled in the art that various changes in form and detail may be made therein without departing from the spirit and scope of the invention.

What is claimed is:

1. A position-sensing circuit for a micro-motor position controller, comprising:

a micro-motor comprised of a first input, a second input, a first stator, a second stator, and an armature, wherein a first capacitor is formed by the first stator and the armature and a second capacitor is formed by the second stator and the armature and the capacitance values of the first and second capacitors are determined so that a voltage level measured between the armature and ground is at or near zero, and wherein a ratio between a capacitance value of the first capacitor and a capacitance value of the second capacitor mimics a ratio between a first input value at the first input and a second input value at the second input of the micro-motor.

2. A position-sensing circuit for a micro-motor position controller, comprising:

a micro-motor comprised of a first stator, a second stator and an armature, wherein a first capacitor is created between the first stator and the armature and a second capacitor is created between the second stator and the armature;

a first AC bridge driver amplifier coupled to the first stator and a second AC bridge driver amplifier coupled to the second stator, wherein the gain on the first AC bridge driver amplifier is used to determine a first capacitance value (a*C) for the first capacitor and the gain on the second AC bridge driver amplifier is used to determine a second capacitance value ((1-a)*C) for the second capacitor;

an oscillator for generating a waveform, wherein an output of the oscillator is coupled to an input of the first and second AC bridge driver amplifiers; and an error detector coupled between the output of the oscillator and the armature, wherein the error detector determines an error signal based upon the ratio of the first and second capacitance values.

3. The position-sensing circuit of claim 2, wherein the first and second AC bridge driver amplifiers are comprised of multiplying digital-to-analog converters.

4. The position-sensing circuit of claim 2, wherein the oscillator generates a sine wave.

5. The position-sensing circuit of claim 2, wherein the error detector is comprised of a synchronous detector.

6. A micro-motor position controller for an optical switch, comprising:

a micro-motor comprised of a first stator, a second stator and an armature, wherein a first capacitor is created between the first stator and the armature and a second capacitor is created between the second stator and the armature;

a first amplifier coupled to the first stator and a second amplifier coupled to the second stator, wherein the gain on the first amplifier and the gain on the second amplifier are used to determine the capacitance values of the first and second capacitors;

an oscillator for generating a waveform, wherein an output of the oscillator is coupled to an input of the first and second amplifiers;

a power supply coupled to the micro-motor for creating a capacitive ratio between the first capacitor and the second capacitor;

a capacitive bridge defined by the first capacitor, the second capacitor, and ground; and an error detector coupled to the output of the armature for generating an error signal indicating the position error of the micro-motor based upon the ratio of the capacitance values in the bridge.

7. The micro-motor position controller of claim 6, further comprising a fine position set circuit.

8. The micro-motor position controller of claim 7, wherein the fine position set circuit is comprised of an offset coupled to an input of a lead lag compensator and a square root circuit coupled between an output of the lead lag compensator and an input of the high voltage power supply.

9. The micro-motor position controller of claim 6, wherein the first and second amplifiers are comprised of a multiplying digital-to-analog converters.

10. The micro-motor position controller of claim 6, wherein the oscillator generates a sine wave.

11. The micro-motor position controller of claim 6, wherein the power supply is comprised of a high voltage supply having a positive voltage output coupled to the first stator and a negative voltage output coupled to the second stator.

12. The micro-motor position controller of claim 6, wherein the power supply is comprised of a voltage supply having a positive voltage output coupled to the armature.

13. A micro-motor position controller for an optical switch comprising:

an amplifier circuit;

a position set circuit;

a bridge circuit coupled between the amplifier circuit and the position set circuit;

a preamplifier circuit coupled to an output of the bridge; and a balanced modulator circuit coupled to an output of a tuned amplifier, wherein the tuned amplifier is coupled to an output of the preamplifier circuit.

14. The micro-motor position controller of claim 13, wherein the balanced modulator circuit is comprised of two signal channels, wherein a first signal channel is comprised of a signal plus an error (signal+error) and a second signal channel is comprised of a negative signal plus an error (−signal+error), and wherein an output of the balanced modulator is genera subtracting the two channels.

15. The micro-motor position controller of claim 14, wherein the amplifier circuit is comprised of a differential amplifier.

16. The micro-motor position controller of claim 14, wherein the position set circuit is comprised of a bridge driver circuit and a potentiometer.

17. The micro-motor position controller of claim 14, wherein the bridge circuit is comprised of a resistive divider and a capacitance divider coupled to the micro-motor.

18. The micro-motor position controller of claim 13, further comprising a phase shifter coupled to the position set circuit.

* * * * *